US011174543B2

(12) United States Patent
Ando et al.

(10) Patent No.: US 11,174,543 B2
(45) Date of Patent: Nov. 16, 2021

(54) CASE HARDENING STEEL, METHOD OF PRODUCING CASE HARDENING STEEL, AND METHOD OF PRODUCING GEAR PART

(71) Applicant: JFE STEEL CORPORATION, Tokyo (JP)

(72) Inventors: Keisuke Ando, Tokyo (JP); Takashi Iwamoto, Tokyo (JP); Kunikazu Tomita, Tokyo (JP); Kazukuni Hase, Tokyo (JP); Kimihiro Nishimura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 89 days.

(21) Appl. No.: 16/305,519

(22) PCT Filed: May 31, 2017

(86) PCT No.: PCT/JP2017/020258
§ 371 (c)(1),
(2) Date: Nov. 29, 2018

(87) PCT Pub. No.: WO2017/209180
PCT Pub. Date: Dec. 7, 2017

(65) Prior Publication Data
US 2019/0352762 A1  Nov. 21, 2019

(30) Foreign Application Priority Data

May 31, 2016 (JP) .............................. JP2016-109532
Sep. 9, 2016 (JP) .............................. JP2016-176921

(51) Int. Cl.
| C23C 8/22 | (2006.01) |
| C21D 1/06 | (2006.01) |
| C21D 8/06 | (2006.01) |
| C21D 9/32 | (2006.01) |
| C21D 9/52 | (2006.01) |
| C22C 38/00 | (2006.01) |
| C22C 38/02 | (2006.01) |
| C22C 38/04 | (2006.01) |
| C22C 38/06 | (2006.01) |
| C22C 38/22 | (2006.01) |
| C22C 38/26 | (2006.01) |
| C22C 38/28 | (2006.01) |
| C23C 8/02 | (2006.01) |
| C23C 8/80 | (2006.01) |
| F16H 55/06 | (2006.01) |

(52) U.S. Cl.
CPC ............... *C23C 8/22* (2013.01); *C21D 1/06* (2013.01); *C21D 8/065* (2013.01); *C21D 9/32* (2013.01); *C21D 9/525* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/26* (2013.01); *C22C 38/28* (2013.01); *C23C 8/02* (2013.01); *C23C 8/80* (2013.01); *F16H 55/06* (2013.01)

(58) Field of Classification Search
CPC .. C23C 8/22; C21D 1/06; C21D 8/065; C21D 9/525; C21D 9/32; C22C 38/28; C22C 38/26; C22C 38/22; C22C 38/04; C22C 38/02
See application file for complete search history.

(56) References Cited

U.S. PATENT DOCUMENTS

| 9,506,137 B2 | 11/2016 | Koyama et al. |
| 2005/0081962 A1 | 4/2005 | Matsuzaki et al. |
| 2013/0174943 A1 | 7/2013 | Okamoto et al. |
| 2016/0060744 A1 | 3/2016 | Kubota et al. |

FOREIGN PATENT DOCUMENTS

| CN | 1617943 A | 5/2005 |
| CN | 103124801 A | 5/2013 |
| CN | 105121687 A | 12/2015 |
| JP | H07188895 A | 7/1995 |
| JP | H07122118 B2 | 12/1995 |
| JP | 2945714 B2 | 9/1999 |
| JP | 5099276 B1 | 12/2012 |
| JP | 5505263 B2 | 5/2014 |
| JP | 2015134947 A | 7/2015 |
| JP | 2015134949 A | 7/2015 |
| KR | 1020150126699 A | 11/2015 |
| WO | 2014171472 A1 | 10/2014 |

OTHER PUBLICATIONS

Feb. 22, 2019, the Extended European Search Report issued by the European Patent Office in the corresponding European Patent Application No. 17806731.0.
Jun. 1, 2020, Office Action issued by the China National Intellectual Property Administration in the corresponding Chinese Patent Application No. 201780032967.X with English language concise statement of relevance.
Mar. 3, 2020, Office Action issued by the Korean Intellectual Property Office in the corresponding Korean Patent Application No. 10-2018-7036498 with English language concise statement of relevance.

(Continued)

*Primary Examiner* — Jessee R Roe
(74) *Attorney, Agent, or Firm* — Kenja IP Law PC

(57) ABSTRACT

A case hardening steel suitable as raw material for producing a mechanical structural part having high rotating bending fatigue strength and pitting fatigue strength at relatively low cost and a method of producing the case hardening steel are provided. A case hardening steel comprises a chemical composition containing, in mass %, C, Si, Mn, P, S, Cr, Mo, Al, N, and O in a predetermined relationship, with a balance being Fe and inevitable impurities, wherein $\sqrt{I} \leq 80$ (where I denotes an area ($\mu m^2$) of an oxide-based inclusion located in a fish eye central portion at a fracture surface after subjecting the case hardening steel to carburizing-quenching and tempering and then performing a rotating bending fatigue test).

8 Claims, 2 Drawing Sheets

(56) References Cited

OTHER PUBLICATIONS

Aug. 22, 2017, International Search Report issued in the International Patent Application No. PCT/JP2017/020258.

CASE HARDENING STEEL, METHOD OF PRODUCING CASE HARDENING STEEL, AND METHOD OF PRODUCING GEAR PART

TECHNICAL FIELD

The present disclosure relates to a case hardening steel used as raw material of mechanical structural parts of vehicles, industrial machines, and the like and a method of producing the case hardening steel, and a method of producing a gear part. The present disclosure particularly relates to a case hardening steel suitable as raw material of mechanical structural parts having high rotating bending fatigue strength and pitting fatigue strength, and a method of producing the case hardening steel.

BACKGROUND

Mechanical structural parts such as gears used in drive transmission parts of vehicles and the like have been required to be smaller in size with weight reductions of automotive bodies for energy saving in recent years. Meanwhile, load increases for higher engine output have raised the need to improve the durability of gears.

The durability of a gear typically depends on a rotating bending fatigue fracture of a gear tooth root and a pitting fatigue fracture of a gear tooth surface. For the purpose of improving rotating bending fatigue strength and pitting fatigue strength, various carburized case hardening steels have been proposed that involve morphological control of inclusions or inhibition of the formation of an abnormally carburized layer by adding trace elements, or imparting temper softening resistance, i.e. suppressing a decrease in hardness caused by tempering.

For example, JP H7-122118 B2 (PTL 1) discloses the following method: By reducing Si in steel to less than 0.15% and controlling the amounts of Mn, Cr, Mo, and Ni, a grain boundary oxidation layer in the surface layer after carburizing heat treatment is reduced to reduce cracks and also the formation of an imperfect quenched layer is inhibited to prevent a decrease in surface hardness and enhance fatigue strength. Moreover, by adding Ca, stretching of MnS which promotes the formation and propagation of cracks is controlled.

JP 2945714 B2 (PTL 2) discloses a method of enhancing temper softening resistance by using, as raw material, a steel material containing 0.25% or more and 1.50% or less Si.

JP 5099276 B2 (PTL 3) discloses a method of suppressing a decrease in gas carburizing property and enhancing pitting fatigue strength even when the amount of Si is increased, by limiting the amounts of Si, Mn, and Cr contributing to improved temper softening resistance to predetermined amounts or more and forming an alloy depletion layer composed of these elements in the surface layer of the steel material.

JP 5505263 B2 (PTL 4) discloses a method of delaying the formation of microcracks upon low cycle fatigue by limiting, to a predetermined value or more, the projection core hardness that is determined from the core hardness after carburizing-quenching, the effective hardened case depth, and half of the radius or thickness of a failure site.

JP H7-188895 A (PTL 5) discloses a method of ensuring high fatigue strength and reducing peeling of the contact surface, i.e. improving pitting resistance, by controlling the amount of carbon and the amount of nitrogen of the surface in carburizing treatment or carbonitriding treatment within a specific range to facilitate the formation of fine carbide in the surface layer part and obtain an appropriate amount of retained austenite in the surface layer part.

CITATION LIST

Patent Literatures

PTL 1: JP H7-122118 B2
PTL 2: JP 2945714 B2
PTL 3: JP 5099276 B2
PTL 4: JP 5505263 B2
PTL 5: JP H7-188895 A

SUMMARY

Technical Problem

However, the above-mentioned methods described in PTL 1 to PTL 5 have the following problems.

According to PTL 1, by reducing Si to less than 0.15%, a grain boundary oxidation layer and an imperfect quenched layer decrease, so that cracks caused by rotating bending fatigue of the gear tooth root of the gear can be suppressed. However, the temper softening resistance rather decreases, and fracture initiation shifts from the gear tooth root side to the gear tooth surface side, as a result of which temper softening by frictional heat at the gear tooth surface cannot be suppressed and the surface softens. This facilitates peeling damage of the gear tooth surface, i.e. pitting, and causes a decrease in pitting fatigue strength.

According to PTL 2, Si is added in order to increase the temper softening resistance. However, the addition of Si causes a grain boundary oxidation layer to form more in typical gas carburizing. Such a grain boundary oxidation layer becomes a fatigue origin, and as a result the rotating bending fatigue strength decreases. This leaves no alternative but to limit carburizing treatment to plasma carburizing or vacuum carburizing with which no grain boundary oxidation layer is formed. Such special carburizing treatment is, however, disadvantageous as it requires high production cost, and unsuitable for mass production on an industrial scale.

According to PTL 3, the temper softening resistance is improved by the addition of Si, Mn, and Cr. However, in the case where the content of Mn or Cr that significantly decreases the Ms point is high, the amount of retained austenite after carburizing-quenching increases, and the surface layer hardness decreases. Consequently, the pitting fatigue strength and the rotating bending fatigue strength decrease.

According to PTL 4, excellent low cycle fatigue property is achieved by limiting the projection core hardness to a predetermined value or more. However, sufficient temper softening resistance may be unable to be obtained depending on the balance of the additive amounts of Si, Mn, Cr, and Mo. In such a case, the pitting fatigue strength decreases.

According to PTL 5, the addition of expensive V is essential, and also the addition of a large amount of expensive Mo is permitted. This leads to a considerable increase in production cost. Besides, these elements increase the precipitation of carbonitride, promoting cracks in continuous casting.

It could therefore be helpful to provide a case hardening steel suitable as raw material for producing a mechanical structural part having high rotating bending fatigue strength and pitting fatigue strength at relatively low cost, and a method of producing the case hardening steel.

Solution to Problem

We conducted keen examination on the influences of components, various properties after carburizing, and inclusions on the fatigue properties after carburizing-quenching and tempering. We consequently discovered the following (A) to (C):

(A) If softening due to heat generation at a contact surface in, for example, a gear is suppressed by increasing the amounts of Si, Mn, Cr, and Mo in steel material and enhancing the temper softening resistance, cracks of the gear tooth surface when driving the gear can be suppressed.

(B) Regarding a grain boundary oxidation layer which can be an origin of bending fatigue and fatigue cracks, by adding Si, Mn, Cr, and Mo each in a predetermined amount or more, the growth direction of the grain boundary oxidation layer changes from the depth direction to the surface density increasing direction. Consequently, there is no such oxidation layer grown in the depth direction that can be an origin of bending fatigue and fatigue cracks, and the resultant oxidation layer is unlikely to be an origin of bending fatigue and fatigue cracks.

(C) As stated in the foregoing (A) and (B), Si, Mn, Cr, and Mo are effective in improving the temper softening resistance and controlling the grain boundary oxidation layer. However, excessively adding these elements increases the amount of retained austenite and promotes fatigue cracks. It is therefore necessary to precisely control the contents of Si, Mn, Cr, and Mo.

We thus provide:

[1] A case hardening steel comprising a chemical composition containing (consisting of), in mass %, C: 0.15% or more and 0.30% or less, Si: 0.80% or more and 2.00% or less, Mn: 0.20% or more and 0.80% or less, P: 0.003% or more and 0.030% or less, S: 0.005% or more and 0.050% or less, Cr: 1.00% or more and less than 1.80%, Mo: 0.03% or more and 0.30% or less, Al: 0.020% or more and 0.060% or less, N: 0.0060% or more and 0.0300% or less, and O: 0.0003% or more and 0.0025% or less within a range in which the following Expression (1) and Expression (2) are satisfied, with the balance being Fe and inevitable impurities, wherein the following Expression (3) is satisfied:

$$[\% \text{ Si}]+([\% \text{ Mn}]+[\% \text{ Cr}]+[\% \text{ Mo}])/3 \geq 1.5 \tag{1}$$

$$180-45[\% \text{ Mn}]-14[\% \text{ Cr}]-51[\% \text{ Mo}]+5[\% \text{ Si}] \geq 125 \tag{2}$$

$$\sqrt{I} \leq 80 \tag{3},$$

where [% M] denotes a content of M element in mass %, and I denotes an area, in $\mu m^2$, of an oxide-based inclusion located in a fish eye central portion at a fracture surface after subjecting the case hardening steel to carburizing-quenching and tempering and then performing a rotating bending fatigue test.

[2] The case hardening steel according to [1], wherein the chemical composition further contains, in mass %, one or more selected from the group consisting of Nb: 0.050% or less, Ti: less than 0.025%, and Sb: 0.035% or less.

[3] The case hardening steel according to [1] or [2], wherein the chemical composition further contains, in mass %, one or more selected from the group consisting of Cu: 1.0% or less, Ni: 1.0% or less, and V: 0.050% or less.

[4] The case hardening steel according to any one of [1] to [3], wherein the chemical composition further contains, in mass %, one or more selected from the group consisting of Ca: 0.0050% or less, Sn: 0.50% or less, Se: 0.30% or less, Ta: 0.10% or less, and Hf: 0.10% or less.

[5] A method of producing a case hardening steel, comprising subjecting a cast steel to hot working by hot forging and/or hot rolling with a reduction in area, to obtain a case hardening steel which is a steel bar or a wire rod, wherein the cast steel has a chemical composition containing, in mass %, C: 0.15% or more and 0.30% or less, Si: 0.80% or more and 2.00% or less, Mn: 0.20% or more and 0.80% or less, P: 0.003% or more and 0.030% or less, S: 0.005% or more and 0.050% or less, Cr: 1.00% or more and less than 1.80%, Mo: 0.03% or more and 0.30% or less, Al: 0.020% or more and 0.060% or less, N: 0.0060% or more and 0.0300% or less, and O: 0.0003% or more and 0.0025% or less within a range in which the following Expression (1) and Expression (2) are satisfied, with the balance being Fe and inevitable impurities, and the reduction in area satisfies the following Expression (4):

$$[\% \text{ Si}]+([\% \text{ Mn}]+[\% \text{ Cr}]+[\% \text{ Mo}])/3 \geq 1.5 \tag{1}$$

$$180-45[\% \text{ Mn}]-14[\% \text{ Cr}]-51[\% \text{ Mo}]+5[\% \text{ Si}] \geq 125 \tag{2}$$

$$(S1-S2)/S1 \geq 0.960 \tag{4},$$

where S1 denotes a cross-sectional area, in $mm^2$, of the cast steel in a section orthogonal to a stretching direction in the hot working, and S2 denotes a cross-sectional area, in $mm^2$, of the steel bar or the wire rod in a section orthogonal to the stretching direction in the hot working.

[6] The method of producing a case hardening steel according to [5], wherein the chemical composition further contains, in mass %, one or more selected from the group consisting of Nb: 0.050% or less, Ti: less than 0.025%, and Sb: 0.035% or less.

[7] The method of producing a case hardening steel according to [5] or [6], wherein the chemical composition further contains, in mass %, one or more selected from the group consisting of Cu: 1.0% or less, Ni: 1.0% or less, and V: 0.050% or less.

[8] The method of producing a case hardening steel according to any one of [5] to [7], wherein the chemical composition further contains, in mass %, one or more selected from the group consisting of Ca: 0.0050% or less, Sn: 0.50% or less, Se: 0.30% or less, Ta: 0.10% or less, and Hf: 0.10% or less.

[9] A method of producing a gear part, comprising: subjecting the case hardening steel according to any one of [1] to [4] to either mechanical working or forging and mechanical working subsequent to the forging, into a gear shape; and thereafter subjecting the case hardening steel to carburizing-quenching and tempering, to obtain a gear part.

[10] A method of producing a gear part, comprising: the method of producing a case hardening steel according to any one of [5] to [8]; subjecting the case hardening steel to either mechanical working or forging and mechanical working subsequent to the forging, into a gear shape; and thereafter subjecting the case hardening steel to carburizing-quenching and tempering, to obtain a gear part.

Advantageous Effect

It is thus possible to provide a case hardening steel suitable as raw material for producing a mechanical structural part having high rotating bending fatigue strength and pitting fatigue strength at relatively low cost, and a method of producing the case hardening steel. For example, in the case of producing gears as mechanical structural parts using the presently disclosed steel, gears excellent in not only the rotating bending fatigue property of the gear tooth root but also the pitting fatigue property of the gear tooth surface can be mass-produced.

DETAILED DESCRIPTION

Figure 1:
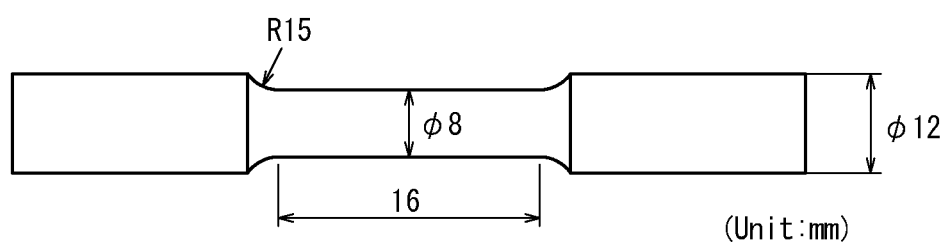
FIG. 1 is a diagram illustrating a rotating bending fatigue test piece.

The reasons for limiting the chemical composition of steel to the above-mentioned range in the present disclosure are described first. In the following description, "%" regarding components denotes mass % unless otherwise noted.

C: 0.15% or more and 0.30% or less

The C content needs to be 0.15% or more, in order to enhance the hardness of a central portion by quenching after carburizing treatment. If the C content is more than 0.30%, however, the core toughness decreases. The C content is therefore limited to 0.15% or more and 0.30% or less. The C content is preferably 0.15% or more and 0.25% or less.

Si: 0.80% or more and 2.00% or less

Si is an element that enhances the temper softening resistance in a temperature range of 200° C. to 300° C. which a gear or the like is expected to reach when rolling, and improves quench hardenability while inhibiting the formation of retained austenite which causes a decrease in the hardness of the carburized surface layer part. Si also has an effect of suppressing a decrease of dislocation density that contributes to fatigue crack propagation suppression, by inhibiting the growth of carbide in this temperature range. To yield steel having such effects, the Si content needs to be 0.80% or more. Meanwhile, Si is a ferrite-stabilizing element, and excessively adding Si increases the $Ac_3$ transformation point and facilitates the formation of ferrite in the core having low carbon content in a normal quenching temperature range, which causes a decrease in strength. Excessively adding Si also hinders carburizing, and causes a decrease in the hardness of the carburized surface layer part. These adverse effects can be prevented if the Si content is 2.00% or less. The Si content is therefore limited to 0.80% or more and 2.00% or less. The Si content is preferably 0.90% or more and 1.60% or less.

Mn: 0.20% or more and 0.80% or less

Mn is an element effective in improving quench hardenability, and the Mn content needs to be 0.20% or more. Meanwhile, Mn tends to form an abnormally carburized layer. Besides, excessively adding Mn causes an excessive amount of retained austenite, which leads to lower hardness. The upper limit is therefore 0.80%. The Mn content is preferably 0.40% or more and 0.60% or less.

P: 0.003% or more and 0.030% or less

P segregates to grain boundaries, and causes a decrease in the toughness of the carburized layer and the inside. The P content is therefore desirably as low as possible. In detail, if the P content is more than 0.030%, the adverse effect occurs. The P content is therefore 0.030% or less. In terms of production cost, the lower limit of the P content is 0.003%.

S: 0.005% or more and 0.050% or less

S has a function of forming sulfide with Mn to improve machinability by cutting, and so the S content is 0.005% or more. Meanwhile, excessively adding S causes decreases in the fatigue strength and toughness of the part. The upper limit of the S content is therefore 0.050%. The S content is preferably 0.010% or more and 0.030% or less.

Cr: 1.00% or more and less than 1.80%

Cr is an element effective in improving not only quench hardenability but also temper softening resistance. If the Cr content is less than 1.00%, the effect of adding Cr is poor. If the Cr content is 1.80% or more, the effect of enhancing the temper softening resistance is saturated, and an abnormally carburized layer tends to form. This causes a decrease in rotating bending fatigue strength. The Cr content is therefore limited to 1.00% or more and less than 1.80%. The Cr content is preferably 1.20% or more and 1.60% or less.

Mo: 0.03% or more and 0.30% or less

Mo is an element that has an effect of improving quench hardenability, temper softening resistance, and toughness and also refining the crystal grain size after carburizing treatment. If the Mo content is less than 0.03%, the effect of adding Mo is poor. The lower limit of the Mo content is therefore 0.03%. Adding a large amount of Mo causes an excessive amount of retained austenite, which leads to not only lower hardness but also higher production cost. The upper limit of the Mo content is therefore 0.30%. In terms of reducing the amount of retained austenite and the production cost, the upper limit is preferably 0.20%.

Al: 0.020% or more and 0.060% or less

Al is an element that bonds with N to form AlN and contributes to finer austenite crystal grains. To achieve this effect, the Al content needs to be 0.020% or more. If the Al content is more than 0.060%, the formation of $Al_2O_3$ inclusion which is detrimental to fatigue strength is promoted. The Al content is therefore limited to 0.020% or more and 0.060% or less. The Al content is preferably 0.020% or more and 0.040% or less.

N: 0.0060% or more and 0.0300% or less

N is an element that bonds with Al to form AlN and contributes to finer austenite crystal grains. To achieve this effect, the N content needs to be 0.0060% or more, although the appropriate additive amount depends on the quantitative balance with Al. Excessively adding N causes blow holes in the steel ingot during solidification and decreases forgeability. The upper limit of the N content is therefore 0.0300%. The N content is preferably 0.0090% or more and 0.0150% or less.

O: 0.0003% or more and 0.0025% or less

O is an element that exists as an oxide-based inclusion in the steel and impairs fatigue strength. The O content is therefore desirably as low as possible, but 0.0025% or less O is allowable. The O content is preferably 0.0015% or less. In terms of production cost, the lower limit of the O content is 0.0003%.

The presently disclosed steel contains the components described above with the balance being Fe and inevitable impurities. Further, the following optional components may be added within a range that does not impair the functions according to the present disclosure, for purposes such as imparting other properties.

Nb: 0.050% or less

Nb is a carbonitride forming element, and refines the austenite grain size in carburizing and contributes to improved pitting fatigue strength and rotating bending fatigue strength. To effectively achieve this effect, the Nb content is preferably 0.010% or more in the case of adding Nb. If the Nb content is more than 0.050%, the effect is saturated. Besides, adding a large amount of Nb causes an increase in cost. The upper limit of the Nb content is therefore preferably 0.050%. The Nb content is more preferably 0.010% or more and less than 0.025%.

Ti: less than 0.025%

Ti is a carbonitride forming element as with Nb, and refines the austenite grain size in carburizing and contributes to improved pitting fatigue strength and rotating bending fatigue strength. To effectively achieve this effect, the Ti content is preferably 0.005% or more in the case of adding Ti. If the Ti content is 0.025% or more, the effect is saturated. Besides, excessively adding Ti causes the formation of coarse carbonitride and leads to a decrease in the above-mentioned fatigue strength. The upper limit of the Ti content is therefore preferably 0.025%.

Sb: 0.035% or less

Sb has strong tendency to segregate to grain boundaries, and has an effect of reducing the formation of an abnormally carburized layer in the outermost surface layer of the steel to improve the rotating bending fatigue strength by suppressing grain boundary oxidation of Si, Mn, Cr, and the like which contribute to improved quench hardenability in carburizing treatment. To effectively achieve this effect, the Sb content is preferably 0.003% or more in the case of adding Sb. Excessively adding Sb not only causes an increase in cost but also causes a decrease in toughness. The Sb content is therefore preferably 0.035% or less. The Sb content is more preferably 0.005% or more and 0.020% or less.

Cu: 1.0% or less

Cu is an element that contributes to improved quench hardenability. Cu is also a useful element that, when added together with Se, bonds with Se in the steel to exert a crystal grain coarsening prevention effect. To achieve these effects, the Cu content is preferably 0.01% or more. If the Cu content is more than 1.0%, there is a possibility that the surface of the rolled material becomes rough and the rough surface remains as a defect. The upper limit of the Cu content is therefore preferably 1.0%. The Cu content is more preferably 0.10% or more and 0.50% or less.

Ni: 1.0% or less

Ni is an element that contributes to improved quench hardenability and is also useful in improving toughness. To achieve these effects, the Ni content is preferably 0.01% or more. If the Ni content is more than 1.0%, the effects are saturated. The upper limit of the Ni content is therefore preferably 1.0%. The Ni content is more preferably 0.10% or more and 0.50% or less.

V: 0.050% or less

V is a carbonitride forming element as with Nb, and refines the austenite grain size in carburizing and contributes to improved fatigue strength. V also has an effect of reducing the grain boundary oxidation layer depth. To effectively achieve these effects, the V content is preferably 0.005% or more in the case of adding V. If the V content is more than 0.050%, the effects are saturated. Besides, excessively adding V causes the formation of coarse carbonitride and leads to a decrease in fatigue strength. The upper limit of the V content is therefore preferably 0.050%. The V content is more preferably 0.005% or more and 0.030% or less.

Ca: 0.0050% or less

Ca is an element that controls sulfide morphology and is useful in improving machinability by cutting. To achieve these effects, the Ca content is preferably 0.0005% or more. If the Ca content is more than 0.0050%, not only the effects are saturated, but also the formation of a coarse oxide-based inclusion which becomes a fatigue fracture origin is promoted. The upper limit of the Ca content is therefore preferably 0.0050%. The Ca content is more preferably 0.0005% or more and 0.0020% or less.

Sn: 0.50% or less

Sn is an element effective in improving the corrosion resistance of the steel material surface. In terms of improving the corrosion resistance, the Sn content is preferably 0.003% or more. Excessively adding Sn degrades forgeability. The upper limit of the Sn content is therefore preferably 0.50%. The Sn content is more preferably 0.010% or more and 0.050% or less.

Se: 0.30% or less

Se bonds with Mn or Cu and disperses in the steel as a precipitate. Se precipitate is stably present in a carburizing heat treatment temperature range with little precipitate growth, and has a high austenite grain size pinning effect. Thus, the addition of Se is effective in preventing crystal grain coarsening. To achieve this effect, the Se content is preferably 0.001% or more. If the Se content is more than 0.30%, the crystal grain coarsening prevention effect is saturated. The upper limit of the Se content is therefore preferably 0.30%. The Se content is more preferably 0.005% or more and 0.100% or less.

Ta: 0.10% or less

Ta forms carbide in the steel, and suppresses coarsening of austenite grain size in carburizing heat treatment by a pinning effect. To achieve this effect, the Ta content is preferably 0.003% or more. If the Ta content is more than 0.10%, cracks tend to occur during casting solidification, and a defect may remain after rolling and forging. The upper limit of the Ta content is therefore preferably 0.10%. The Ta content is more preferably 0.005% or more and 0.050% or less.

Hf: 0.10% or less

Hf forms carbide in the steel, and suppresses coarsening of austenite grain size in carburizing heat treatment by a pinning effect. To achieve this effect, the Hf content is preferably 0.003% or more. If the Hf content is more than 0.10%, there is a possibility that a coarse precipitate forms during casting solidification and causes decreases in grain coarsening inhibiting capability and fatigue strength. The upper limit of the Hf content is therefore preferably 0.10%. The Hf content is more preferably 0.005% or more and 0.050% or less.

The chemical composition of the steel suffices to contain the elements described above and the balance being Fe and inevitable impurities, but preferably consists of the elements described above and the balance being Fe and inevitable impurities.

We discovered that, in the case where a case hardening steel having the above-mentioned chemical composition satisfies the following Expression (1) and Expression (2), a mechanical structural part produced by subjecting the case hardening steel to carburizing-quenching and tempering exhibits hitherto unattainable excellent bending fatigue strength and pitting fatigue strength:

$$[\% \text{ Si}] + ([\% \text{ Mn}] + [\% \text{ Cr}] + [\% \text{ Mo}])/3 \geq 1.5 \quad (1)$$

$$180 - 45[\% \text{ Mn}] - 14[\% \text{ Cr}] - 51[\% \text{ Mo}] + 5[\% \text{ Si}] \geq 125 \quad (2)$$

where [% M] denotes the content (mass %) of M element.

Expression (1) indicates the factors influencing the temper softening resistance. If the value of the left side is less than 1.5, the temper softening resistance improving effect is poor. Expression (2) indicates the factors influencing the amount of retained austenite. If the value of the left side is less than 125, the hardness of the carburized surface layer part decreases, leading to decreases in pitting fatigue strength and rotating bending fatigue strength. According to the present disclosure, Expression (1) is satisfied to enhance the temper softening resistance in a temperature range of 200° C. or more and 300° C. or less which a gear or the like is expected to reach when rolling, and Expression (2) is satisfied to reduce the amount of retained austenite which causes a decrease in the hardness of the carburized surface layer part and thus suppress decreases in pitting fatigue strength and rotating bending fatigue strength.

However, we also discovered that, even in the case where the elements satisfy Expressions (1) and (2), if the size of an oxide-based inclusion located at a fracture surface of a test piece after a rotating bending fatigue test is greater than a predetermined value, the pitting fatigue strength and the rotating bending fatigue strength decrease due to the oxide-based inclusion, resulting in an early fatigue fracture. Hence, it is important that the case hardening steel according to the present disclosure satisfies the following Expression (3) after carburizing-quenching and tempering. The value of the left side $\sqrt{I}$ in Expression (3) is more preferably 60 or less, and further preferably 40 or less.

$$\sqrt{I} \leq 80 \tag{3}$$

In Expression (3), I on the left side is an index indicating the size of a maximum oxide-based inclusion as a fatigue fracture origin, and is calculated as follows. Seven test pieces are collected from a case hardening steel (steel bar or wire rod). The test pieces are collected from a diameter/2 position in the stretching direction in hot working (i.e. the rolling direction in the case of hot rolling, and the stretching direction in forging in the case of hot forging), and each have dimensions of parallel portion diameter 8 mm×parallel portion length 16 mm as illustrated in FIG. 1.

Figure 2:
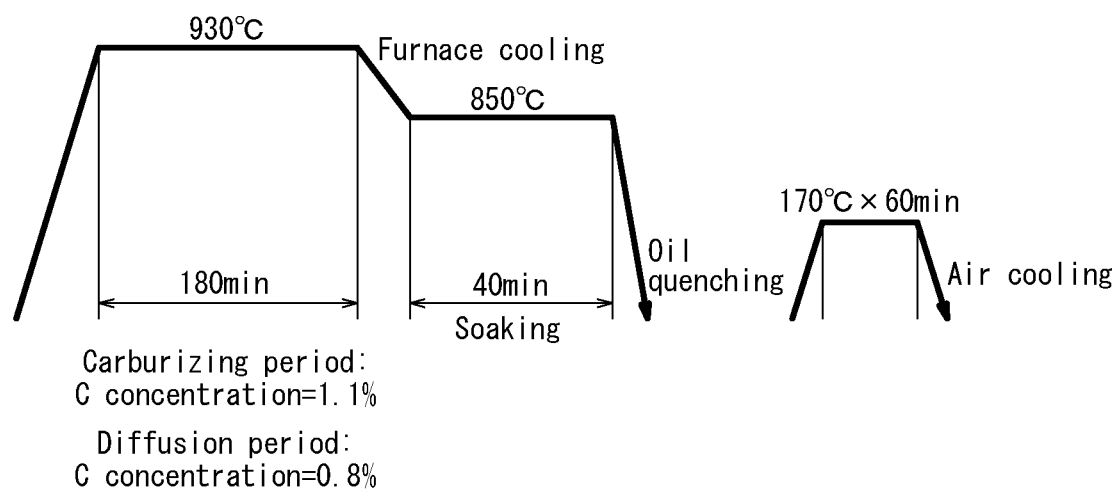
FIG. 2 is a diagram illustrating heat treatment conditions in carburizing-quenching and tempering treatment.

The test pieces are subjected to carburizing-quenching and tempering under the conditions illustrated in FIG. 2 (a carburizing temperature of 930° C. for 180 min, a quenching temperature of 850° C. for 40 min, a tempering temperature of 170° C. for 60 min), and then a completely reversed Ono-type rotating bending fatigue test is conducted to induce a fish eye fracture. The test conditions involve polishing the surface by 0.1 mm after carburizing and applying a load stress of 1000 MPa and a rotational speed of 3500 rpm. For a test piece with minimum fatigue life from among the seven test pieces, a fracture surface is observed by a scanning electron microscope, and the area of an oxide-based inclusion located in a fish eye central portion, that is, a maximum oxide-based inclusion, is measured by image analysis and taken to be I.

Such an inclusion size calculation method according to the present disclosure enables evaluation of the size of a maximum oxide-based inclusion in a volume of 3.14×(7.8 mm/2)$^2$×16 mm×7=5349 mm$^3$. With a conventional method of measuring the size, quantity, or density of an oxide-based inclusion present in an area under test, it is impossible to measure the state of an oxide-based inclusion in such a large volume and evaluate any inclusion influencing fatigue life. With the inclusion evaluation method according to the present disclosure, the size of an oxide-based inclusion which actually becomes a fatigue fracture origin of steel in a large volume of 5349 mm$^3$ can be evaluated, so that fatigue life prediction accuracy can be improved.

A method of producing a case hardening steel according to the present disclosure is described below.

To obtain a case hardening steel satisfying Expression (3), it is necessary to, in its production process, adjust the chemical composition of cast steel to the above-mentioned range including Expressions (1) and (2), and subject the cast steel to hot working by hot forging and/or hot rolling with a reduction in area satisfying the following Expression (4) to yield a steel bar or a wire rod:

$$(S1-S2)/S1 \geq 0.960 \tag{4}$$

where S1 denotes the cross-sectional area (mm$^2$) of the cast steel in a section orthogonal to the stretching direction in the hot working, and S2 denotes the cross-sectional area (mm$^2$) of the steel bar or the wire rod in a section orthogonal to the stretching direction in the hot working.

The left side in Expression (4) is an index indicating the reduction in area when performing the hot working on the cast steel. The hot working may be hot forging or hot rolling. The hot working may be both of hot forging and hot rolling. If the index indicated by the left side in Expression (4) is less than 0.960, the pitting fatigue strength and the rotating bending fatigue strength decrease due to an oxide-based inclusion of a large size, resulting in an early fatigue fracture. The left side in Expression (4) is more preferably 0.970 or more, and further preferably 0.985 or more. Thus, by subjecting cast steel satisfying the chemical composition according to the present disclosure to hot working with a reduction in area satisfying Expression (4), case hardening steel satisfying Expression (3) can be obtained after the below-mentioned carburizing-quenching and tempering.

The case hardening steel (steel bar or wire rod) produced in this way is then optionally subjected to hot forging or cold forging. Subsequently, the case hardening steel is mechanically worked by cutting or the like into a part shape (e.g. gear shape). The steel in the part shape is then subjected to carburizing-quenching and tempering treatment, to yield a desired part (e.g. gear). The part may be further worked by shot peening or the like. In the case where the case hardening steel is subjected to hot forging or cold forging in working, the oxide-based inclusion size changes, but the change is not in a direction in which fatigue life deteriorates. Accordingly, the use of the case hardening steel according to the present disclosure is effective even in the case where such forging is performed to produce a part. The carburizing-quenching and tempering conditions for the case hardening steel are not limited, and may be known or any conditions. For example, the conditions may involve a carburizing temperature of 900° C. or more and 1050° C. or less for 60 min or more and 600 min or less, a quenching temperature of 800° C. or more and 900° C. or less for 10 min or more and 120 min or less, and a tempering temperature of 120° C. or more and 250° C. or less for 30 min or more and 180 min or less.

EXAMPLES

The structures and function effects according to the present disclosure are described in more detail below, by way of examples. Note that the present disclosure is not limited to the following examples, and modifications can be made as appropriate within the range in which the subject matter of the disclosure is applicable, with such modifications being also included in the technical scope of the present disclosure.

Cast steels having the chemical compositions (the unit of the content of each element is mass %, with the balance being Fe and inevitable impurities) listed in Table 1 were hot rolled with the reductions in area listed in Table 2, to obtain round steel bars of various dimensions. In Table 1, Nos. 1 to 27 are conforming steels with chemical compositions satisfying the range according to the present disclosure, and Nos. 28 to 52 are comparative steels with chemical compositions not satisfying the range according to the present disclosure.

In Table 2, No. 53 is a comparative example with a reduction in area being outside the limit according to the present disclosure.

(Evaluation Methods)

The conforming steels and the comparative steels were evaluated as follows.

(1) Evaluation of rotating bending fatigue strength and I

Seven test pieces were collected from a diameter/2 position of each of round steel bars obtained from the conforming steels and the comparative steels by the above-mentioned method, and I was calculated by the above-mentioned method. Image-Pro_PLUS produced by Media Cybernetics, Inc. was used for image analysis. The number of repetitions to a fracture (shortest fatigue life out of the seven test pieces) in the completely reversed Ono-type rotating bending fatigue test in this procedure is shown in Table 2. A shortest fatigue life of 100,000 times or more can be regarded as indicating excellent rotating bending fatigue strength.

(2) Evaluation of Pitting Fatigue Strength

Figure 3:
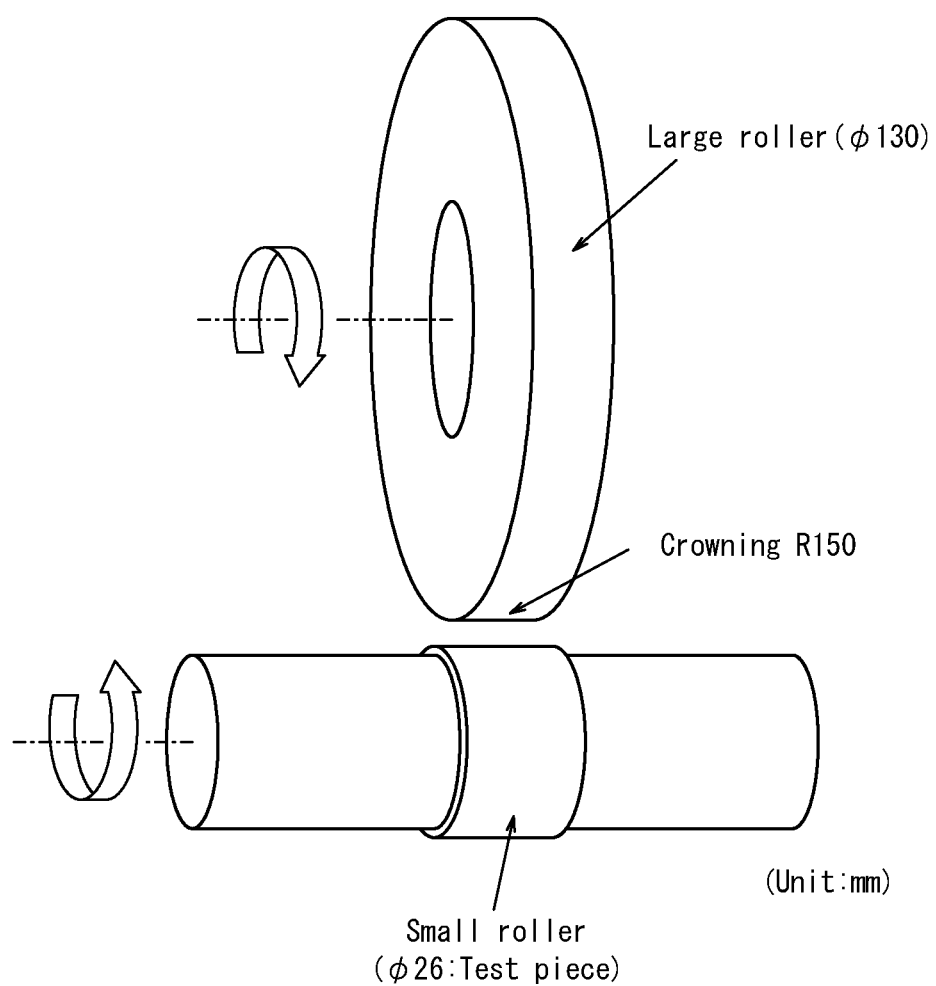
FIG. 3 is a diagram schematically illustrating a roller pitting fatigue test.

A test piece of 26 mmφ illustrated in FIG. 3 was collected from a diameter/2 position of each of round steel bars of 36 mmφ obtained from the conforming steels and the comparative steels, as a roller pitting fatigue test piece (small roller). The obtained test piece was subjected to carburizing-quenching and tempering treatment illustrated in FIG. 2. After this, a roller pitting fatigue test was conducted using a roller pitting fatigue tester under the conditions of a slip rate of 40% and a rotational speed of 1500 rpm, with transmission oil of 80° C. being used for lubrication. As a large roller (crowning R: 150 mm), a quenched-and-tempered part of SUJ2 was used. Here, the pitting fatigue strength was measured and evaluated, with $10^7$ being set as a fatigue limit. A fatigue strength of 2800 MPa or more in this test can be regarded as indicating excellent pitting fatigue strength. The evaluation results as shown in Table 2.

TABLE 1

| Steel No. | C | Si | Mn | P | S | Cr | Mo | Al | N | O | Others | Prescribed Expression (1)*² | Prescribed Expression (2)*³ | Remarks |
|---|---|---|---|---|---|---|---|---|---|---|---|---|---|---|
| 1 | 0.20 | 1.28 | 0.50 | 0.016 | 0.014 | 1.45 | 0.13 | 0.021 | 0.0125 | 0.0010 | — | 2.0 | 137 | Conforming Steel |
| 2 | 0.29 | 0.85 | 0.41 | 0.012 | 0.016 | 1.38 | 0.18 | 0.034 | 0.0100 | 0.0014 | — | 1.5 | 137 | |
| 3 | 0.24 | 1.30 | 0.75 | 0.018 | 0.025 | 1.60 | 0.10 | 0.040 | 0.0140 | 0.0015 | — | 2.1 | 125 | |
| 4 | 0.22 | 0.80 | 0.67 | 0.013 | 0.021 | 1.79 | 0.05 | 0.036 | 0.0139 | 0.0012 | — | 1.6 | 126 | |
| 5 | 0.18 | 0.95 | 0.70 | 0.012 | 0.006 | 1.65 | 0.11 | 0.028 | 0.0115 | 0.0015 | — | 1.8 | 125 | |
| 6 | 0.20 | 1.21 | 0.54 | 0.015 | 0.015 | 1.53 | 0.07 | 0.030 | 0.0132 | 0.0009 | — | 1.9 | 137 | |
| 7 | 0.19 | 1.98 | 0.21 | 0.014 | 0.049 | 1.02 | 0.09 | 0.022 | 0.0091 | 0.0017 | — | 2.4 | 162 | |
| 8 | 0.16 | 1.54 | 0.37 | 0.009 | 0.013 | 1.21 | 0.10 | 0.033 | 0.0128 | 0.0013 | — | 2.1 | 149 | |
| 9 | 0.21 | 1.40 | 0.55 | 0.010 | 0.018 | 1.25 | 0.08 | 0.027 | 0.0103 | 0.0010 | — | 2.0 | 141 | |
| 10 | 0.23 | 1.02 | 0.49 | 0.011 | 0.023 | 1.30 | 0.15 | 0.031 | 0.0096 | 0.0015 | — | 1.7 | 137 | |
| 11 | 0.27 | 0.82 | 0.45 | 0.017 | 0.016 | 1.62 | 0.04 | 0.059 | 0.0081 | 0.0014 | — | 1.5 | 139 | |
| 12 | 0.19 | 0.97 | 0.51 | 0.026 | 0.012 | 1.57 | 0.18 | 0.026 | 0.0118 | 0.0012 | — | 1.7 | 131 | |
| 13 | 0.21 | 1.00 | 0.50 | 0.014 | 0.006 | 1.25 | 0.16 | 0.030 | 0.0110 | 0.0013 | — | 1.6 | 137 | |
| 14 | 0.24 | 1.08 | 0.62 | 0.011 | 0.019 | 1.30 | 0.21 | 0.037 | 0.0092 | 0.0011 | — | 1.8 | 129 | |
| 15 | 0.18 | 1.33 | 0.32 | 0.013 | 0.022 | 1.15 | 0.28 | 0.042 | 0.0289 | 0.0024 | — | 1.9 | 142 | |
| 16 | 0.18 | 1.10 | 0.65 | 0.009 | 0.010 | 1.45 | 0.04 | 0.025 | 0.0100 | 0.0008 | — | 1.8 | 134 | |
| 17 | 0.20 | 0.89 | 0.60 | 0.010 | 0.014 | 1.43 | 0.12 | 0.031 | 0.0124 | 0.0015 | Nb: 0.022 | 1.6 | 131 | |
| 18 | 0.22 | 1.03 | 0.47 | 0.015 | 0.013 | 1.33 | 0.20 | 0.026 | 0.0141 | 0.0013 | Ti: 0.024 | 1.7 | 135 | |
| 19 | 0.21 | 1.48 | 0.43 | 0.012 | 0.018 | 1.50 | 0.05 | 0.028 | 0.0099 | 0.0008 | Sb: 0.018 | 2.1 | 145 | |
| 20 | 0.20 | 1.14 | 0.62 | 0.013 | 0.014 | 1.61 | 0.08 | 0.030 | 0.0125 | 0.0012 | Cu: 0.29 | 1.9 | 131 | |
| 21 | 0.23 | 0.92 | 0.55 | 0.010 | 0.015 | 1.39 | 0.10 | 0.035 | 0.0102 | 0.0011 | Ni: 0.23 | 1.6 | 135 | |
| 22 | 0.19 | 1.72 | 0.25 | 0.015 | 0.020 | 1.18 | 0.25 | 0.034 | 0.0131 | 0.0013 | V: 0.15 | 2.3 | 148 | |
| 23 | 0.21 | 1.25 | 0.52 | 0.012 | 0.011 | 1.49 | 0.08 | 0.029 | 0.0140 | 0.0009 | Ca: 0.0018 | 1.9 | 138 | |
| 24 | 0.22 | 1.34 | 0.34 | 0.011 | 0.013 | 1.70 | 0.06 | 0.027 | 0.0115 | 0.0010 | Sn: 0.012 | 2.0 | 145 | |
| 25 | 0.20 | 1.16 | 0.70 | 0.013 | 0.014 | 1.54 | 0.09 | 0.030 | 0.0099 | 0.0012 | Se: 0.021 | 1.9 | 128 | |
| 26 | 0.19 | 1.20 | 0.48 | 0.014 | 0.016 | 1.37 | 0.12 | 0.031 | 0.0108 | 0.0014 | Ta: 0.021 | 1.9 | 139 | |
| 27 | 0.24 | 0.99 | 0.43 | 0.010 | 0.015 | 1.20 | 0.10 | 0.042 | 0.0124 | 0.0010 | Hf: 0.008 | 1.6 | 144 | |
| 28 | <u>0.14</u> | 1.21 | 0.64 | 0.011 | 0.025 | 1.39 | 0.10 | 0.030 | 0.0072 | 0.0012 | — | 1.9 | 133 | Comparative Steel |
| 29 | <u>0.32</u> | 1.55 | 0.49 | 0.015 | 0.019 | 1.20 | 0.25 | 0.029 | 0.0168 | 0.0015 | — | 2.3 | 126 | |
| 30 | 0.15 | <u>0.56</u> | 0.80 | 0.012 | 0.015 | 1.11 | <u>0.02</u> | 0.028 | 0.0154 | 0.0016 | — | <u>1.2</u> | 130 | |
| 31 | 0.22 | <u>0.79</u> | 0.58 | 0.020 | 0.021 | 1.09 | 0.25 | 0.025 | 0.0122 | 0.0011 | — | <u>1.4</u> | 130 | |
| 32 | 0.17 | <u>2.01</u> | 0.31 | 0.019 | 0.013 | 1.25 | 0.07 | 0.041 | 0.0101 | 0.0013 | — | 2.6 | 155 | |
| 33 | 0.18 | 0.84 | <u>0.19</u> | 0.017 | 0.016 | 1.08 | 0.03 | 0.036 | 0.0096 | 0.0015 | — | <u>1.3</u> | 159 | |
| 34 | 0.19 | 1.29 | <u>0.82</u> | 0.009 | 0.018 | 1.72 | 0.13 | 0.031 | 0.0135 | 0.0012 | — | 2.2 | <u>119</u> | |
| 35 | 0.21 | 1.21 | <u>1.53</u> | 0.021 | <u>0.099</u> | 1.49 | 0.03 | <u>0.010</u> | 0.0250 | 0.0010 | — | 2.2 | 95 | |
| 36 | 0.23 | 1.40 | 0.52 | <u>0.031</u> | 0.032 | 1.55 | 0.08 | 0.033 | 0.0142 | 0.0017 | — | 2.1 | 138 | |
| 37 | 0.20 | 1.35 | 0.67 | 0.014 | <u>0.053</u> | 1.28 | 0.12 | 0.024 | 0.0108 | 0.0016 | — | 2.0 | 133 | |
| 38 | 0.18 | 0.90 | 0.32 | 0.013 | 0.015 | <u>0.96</u> | 0.05 | 0.025 | 0.0114 | 0.0012 | — | <u>1.3</u> | 154 | |
| 39 | 0.22 | 1.05 | 0.70 | 0.012 | 0.012 | <u>1.81</u> | 0.21 | 0.029 | 0.0087 | 0.0010 | — | 2.0 | <u>118</u> | |
| 40 | 0.21 | 0.93 | 0.68 | 0.019 | 0.024 | 1.69 | <u>0.32</u> | 0.031 | 0.0123 | 0.0009 | — | 1.8 | <u>114</u> | |
| 41 | 0.20 | 0.80 | 0.35 | 0.015 | 0.050 | 1.38 | <u>0.60</u> | 0.030 | 0.0120 | 0.0018 | — | 1.6 | <u>118</u> | |
| 42 | 0.17 | 1.26 | 0.54 | 0.010 | 0.018 | 1.46 | 0.07 | <u>0.018</u> | 0.0069 | 0.0014 | — | 2.0 | 138 | |
| 43 | 0.24 | 0.82 | 0.69 | 0.017 | 0.022 | 1.50 | 0.21 | <u>0.065</u> | 0.0179 | 0.0021 | — | 1.6 | <u>121</u> | |
| 44 | 0.26 | 1.13 | 0.43 | 0.012 | 0.016 | 1.37 | 0.15 | 0.023 | <u>0.0059</u> | 0.0010 | — | 1.8 | 139 | |
| 45 | 0.21 | 1.51 | 0.38 | 0.013 | 0.015 | 1.15 | 0.10 | 0.055 | <u>0.0302</u> | 0.0013 | — | 2.1 | 149 | |
| 46 | 0.20 | 1.06 | 0.70 | 0.012 | 0.013 | 1.09 | 0.08 | 0.039 | 0.0138 | <u>0.0026</u> | — | 1.7 | 134 | |
| 47 | 0.22 | 1.02 | 0.48 | 0.012 | 0.010 | 1.35 | 0.20 | 0.030 | 0.0129 | 0.0010 | <u>Ti: 0.025</u> | 1.7 | 134 | |
| 48 | 0.20 | 0.80 | 0.54 | 0.009 | 0.014 | 1.21 | 0.16 | 0.031 | 0.0120 | 0.0015 | — | <u>1.4</u> | 135 | |
| 49 | 0.22 | 0.93 | 0.62 | 0.015 | 0.004 | 1.44 | 0.24 | 0.025 | 0.0104 | 0.0008 | Nb: 0.024 | 1.7 | <u>124</u> | |
| 50 | 0.21 | 0.95 | 0.75 | 0.011 | 0.012 | 1.75 | 0.08 | 0.028 | 0.0140 | 0.0009 | Ca: 0.0015 | 1.8 | <u>122</u> | |

TABLE 1-continued

| Steel No. | Chemical composition (mass %) | | | | | | | | | | | Prescribed Expression (1)[*2] | Prescribed Expression (2)[*3] | Remarks |
| --- | --- | --- | --- | --- | --- | --- | --- | --- | --- | --- | --- | --- | --- | --- |
| | C | Si | Mn | P | S | Cr | Mo | Al | N | O | Others | | | |
| 51 | 0.18 | 0.95 | 0.60 | 0.014 | 0.011 | 1.76 | 0.21 | 0.027 | 0.0082 | 0.0012 | — | 1.8 | <u>122</u> | |
| 52 | 0.24 | 0.82 | 0.71 | 0.017 | 0.018 | 1.38 | 0.27 | 0.030 | 0.0120 | 0.0014 | — | 1.6 | <u>119</u> | |

[*1] Underlines indicate outside application range.

[*2] [% Si] + ([% Mn] + [% Cr] + [% Mo])/3

[*3] 180 − 45 × [% Mn] − 14 × [% Cr] − 51 × [% Mo] + 5 × [% Si]

TABLE 2

| Test No. | Steel No. | (S1 − S2)/S1 | $\sqrt{I}$ (μm) | Rotating bending fatigue test Shortest fatigue life (times) | Roller pitting fatigue strength (MPa) | Remarks |
| --- | --- | --- | --- | --- | --- | --- |
| 1 | 1 | 0.9888 | 39 | $5.1 \times 10^5$ | 3050 | Example |
| 2 | 2 | 0.9895 | 41 | $4.5 \times 10^5$ | 3000 | |
| 3 | 3 | 0.9892 | 43 | $5.2 \times 10^5$ | 3050 | |
| 4 | 4 | 0.9820 | 46 | $6.6 \times 10^5$ | 2800 | |
| 5 | 5 | 0.9941 | 29 | $8.9 \times 10^5$ | 2950 | |
| 6 | 6 | 0.9624 | 76 | $6.9 \times 10^5$ | 3100 | |
| 7 | 7 | 0.9765 | 52 | $3.5 \times 10^5$ | 3350 | |
| 8 | 8 | 0.9792 | 49 | $1.2 \times 10^6$ | 3300 | |
| 9 | 9 | 0.9919 | 30 | $9.1 \times 10^5$ | 3100 | |
| 10 | 10 | 0.9819 | 42 | $7.8 \times 10^5$ | 3150 | |
| 11 | 11 | 0.9891 | 33 | $8.3 \times 10^5$ | 2950 | |
| 12 | 12 | 0.9912 | 29 | $1.0 \times 10^6$ | 2850 | |
| 13 | 13 | 0.9743 | 62 | $7.2 \times 10^5$ | 3000 | |
| 14 | 14 | 0.9878 | 36 | $5.4 \times 10^5$ | 3050 | |
| 15 | 15 | 0.9814 | 45 | $1.1 \times 10^6$ | 3200 | |
| 16 | 16 | 0.9875 | 39 | $7.6 \times 10^5$ | 2950 | |
| 17 | 17 | 0.9920 | 25 | $1.8 \times 10^6$ | 2900 | |
| 18 | 18 | 0.9932 | 27 | $8.0 \times 10^5$ | 3100 | |
| 19 | 19 | 0.9840 | 38 | $5.9 \times 10^5$ | 3200 | |
| 20 | 20 | 0.9920 | 26 | $1.6 \times 10^6$ | 2850 | |
| 21 | 21 | 0.9765 | 56 | $1.2 \times 10^6$ | 2900 | |
| 22 | 22 | 0.9872 | 50 | $7.7 \times 10^5$ | 3250 | |
| 23 | 23 | 0.9903 | 46 | $4.1 \times 10^5$ | 3000 | |
| 24 | 24 | 0.9889 | 45 | $8.5 \times 10^5$ | 3100 | |
| 25 | 25 | 0.9854 | 51 | $5.9 \times 10^5$ | 2950 | |
| 26 | 26 | 0.9910 | 38 | $1.0 \times 10^6$ | 3000 | |
| 27 | 27 | 0.9900 | 40 | $9.0 \times 10^5$ | 3050 | |
| 28 | 28 | 0.9932 | 34 | $2.5 \times 10^4$ | 2500 | Comparative Example |
| 29 | 29 | 0.9901 | 40 | $9.8 \times 10^4$ | 2600 | |
| 30 | 30 | 0.9863 | 48 | $2.4 \times 10^5$ | 2200 | |
| 31 | 31 | 0.9920 | 29 | $5.0 \times 10^5$ | 2400 | |
| 32 | 32 | 0.9814 | 50 | $1.1 \times 10^4$ | 2000 | |
| 33 | 33 | 0.9952 | 21 | $7.5 \times 10^4$ | 2450 | |
| 34 | 34 | 0.9793 | 53 | $1.5 \times 10^5$ | 2650 | |
| 35 | 35 | 0.9639 | 72 | $1.2 \times 10^4$ | 2300 | |
| 36 | 36 | 0.9854 | 45 | $5.8 \times 10^4$ | 2500 | |
| 37 | 37 | 0.9926 | 26 | $6.6 \times 10^4$ | 2550 | |
| 38 | 38 | 0.9897 | 35 | $8.9 \times 10^4$ | 2400 | |
| 39 | 39 | 0.9900 | 30 | $7.1 \times 10^4$ | 2500 | |
| 40 | 40 | 0.9879 | 39 | $7.8 \times 10^4$ | 2400 | |
| 41 | 41 | 0.9818 | 44 | $9.9 \times 10^4$ | 2350 | |
| 42 | 42 | 0.9912 | 27 | $7.5 \times 10^4$ | 2500 | |
| 43 | 43 | 0.9624 | <u>112</u> | $2.8 \times 10^4$ | 2250 | |
| 44 | 44 | 0.9748 | 59 | $1.0 \times 10^5$ | 2400 | |
| 45 | 45 | 0.9905 | 34 | $3.4 \times 10^4$ | 2100 | |
| 46 | 46 | 0.9814 | <u>91</u> | $3.9 \times 10^4$ | 2300 | |
| 47 | 47 | 0.9932 | 38 | $5.6 \times 10^4$ | 2500 | |
| 48 | 48 | 0.9882 | 40 | $6.7 \times 10^5$ | 2400 | |
| 49 | 49 | 0.9910 | 36 | $9.7 \times 10^4$ | 2650 | |
| 50 | 50 | 0.9903 | 47 | $8.1 \times 10^4$ | 2550 | |
| 51 | 51 | 0.9941 | 25 | $9.8 \times 10^4$ | 2600 | |
| 52 | 52 | 0.9910 | 38 | $7.3 \times 10^4$ | 2550 | |
| 53 | 13 | <u>0.9542</u> | <u>88</u> | $5.5 \times 10^4$ | 2300 | |

[*1] Underlines indicate outside application range.

INDUSTRIAL APPLICABILITY

It is thus possible to provide a case hardening steel suitable as raw material for producing a mechanical structural part having high rotating bending fatigue strength and pitting fatigue strength at relatively low cost, and a method of producing the case hardening steel.

The invention claimed is:

1. A case hardening steel comprising
a chemical composition containing, in mass %, C: 0.15% or more and 0.30% or less, Si: 0.80% or more and 2.00% or less, Mn: 0.20% or more and 0.80% or less, P: 0.003% or more and 0.030% or less, S: 0.005% or more and 0.050% or less, Cr: 1.00% or more and less than 1.80%, Mo: 0.03% or more and 0.30% or less, Al: 0.020% or more and 0.060% or less, N: 0.0060% or more and 0.0300% or less, and O: 0.0003% or more and 0.0025% or less within a range in which the following Expression (1) and Expression (2) are satisfied, with the balance being Fe and inevitable impurities,
wherein the following Expression (3) is satisfied:

$$2.4 \geq [\% \text{ Si}] + ([\% \text{ Mn}] + [\% \text{ Cr}] + [\% \text{ Mo}])/3 \geq 1.5 \tag{1}$$

$$162 \geq 180 - 45[\% \text{ Mn}] - 14[\% \text{ Cr}] - 51[\% \text{ Mo}] + 5[\% \text{ Si}] \geq 125 \tag{2}$$

$$\sqrt{I} \geq 80 \tag{3},$$

where [% M] denotes a content of M element in mass %, and I denotes an area, in μm², of an oxide-based inclusion located in a fish eye central portion at a fracture surface after subjecting the case hardening steel to carburizing-quenching and tempering and then performing a rotating bending fatigue test.

2. A method of producing a gear part, comprising:
subjecting the case hardening steel according to claim 1 to either mechanical working or forging and mechanical working subsequent to the forging, into a gear shape; and
thereafter subjecting the case hardening steel to carburizing-quenching and tempering, to obtain a gear part.

3. The case hardening steel according to claim 1,
wherein the chemical composition further contains at least one group selected from the following (A) to (C);
(A) in mass %, one or more selected from the group consisting of Nb: 0.050% or less, Ti: less than 0.025%, and Sb: 0.035% or less,
(B) in mass %, one or more selected from the group consisting of Cu: 1.0% or less, Ni: 1.0% or less, and V: 0.050% or less, and
(C) in mass %, one or more selected from the group consisting of Ca: 0.0050% or less, Sn: 0.50% or less, Se: 0.30% or less, Ta: 0.10% or less, and Hf: 0.10% or less.

4. A method of producing a gear part, comprising:
subjecting the case hardening steel according to claim 3 to either mechanical working or forging and mechanical working subsequent to the forging, into a gear shape; and
thereafter subjecting the case hardening steel to carburizing-quenching and tempering, to obtain a gear part.

5. A method of producing a case hardening steel, comprising
subjecting a cast steel to hot working by hot forging and/or hot rolling with a reduction in area, to obtain a case hardening steel which is a steel bar or a wire rod,
wherein the cast steel has a chemical composition containing, in mass %, C: 0.15% or more and 0.30% or less, Si: 0.80% or more and 2.00% or less, Mn: 0.20% or more and 0.80% or less, P: 0.003% or more and 0.030% or less, S: 0.005% or more and 0.050% or less, Cr: 1.00% or more and less than 1.80%, Mo: 0.03% or more and 0.30% or less, Al: 0.020% or more and 0.060% or less, N: 0.0060% or more and 0.0300% or less, and O: 0.0003% or more and 0.0025% or less within a range in which the following Expression (1) and Expression (2) are satisfied, with the balance being Fe and inevitable impurities, and
the reduction in area satisfies the following Expression (4):

$$2.4 \geq [\% \text{ Si}] + ([\% \text{ Mn}] + [\% \text{ Cr}] + [\% \text{ Mo}])/3 \geq 1.5 \tag{1}$$

$$162 \geq 180 - 45[\% \text{ Mn}] - 14[\% \text{ Cr}] - 51[\% \text{ Mo}] + 5[\% \text{ Si}] \geq 125 \tag{2}$$

$$(S1 - 52)/S1 \geq 0.960 \tag{4},$$

where S1 denotes a cross-sectional area, in mm², of the cast steel in a section orthogonal to a stretching direction in the hot working, and S2 denotes a cross-sectional area, in mm², of the steel bar or the wire rod in a section orthogonal to the stretching direction in the hot working.

6. A method of producing a gear part, comprising:
the method of producing a case hardening steel according to claim 5;
subjecting the case hardening steel to either mechanical working or forging and mechanical working subsequent to the forging, into a gear shape; and
thereafter subjecting the case hardening steel to carburizing-quenching and tempering, to obtain a gear part.

7. The method of producing a case hardening steel according to claim 5,
wherein the chemical composition further contains at least one group selected from the following (A) to (C);
(A) in mass %, one or more selected from the group consisting of Nb: 0.050% or less, Ti: less than 0.025%, and Sb: 0.035% or less,
(B) in mass %, one or more selected from the group consisting of Cu: 1.0% or less, Ni: 1.0% or less, and V: 0.050% or less, and
(C) in mass %, one or more selected from the group consisting of Ca: 0.0050% or less, Sn: 0.50% or less, Se: 0.30% or less, Ta: 0.10% or less, and Hf: 0.10% or less.

8. A method of producing a gear part, comprising:
the method of producing a case hardening steel according to claim 7;
subjecting the case hardening steel to either mechanical working or forging and mechanical working subsequent to the forging, into a gear shape; and
thereafter subjecting the case hardening steel to carburizing-quenching and tempering, to obtain a gear part.

* * * * *